March 9, 1926.

G. L. BURLINGAME 1,575,618

CHILD'S TOY VEHICLE

Filed Oct. 1, 1921

Inventor
George L. Burlingame.
By Gabel + Mueller
Attys.

March 9, 1926.
G. L. BURLINGAME
1,575,618
CHILD'S TOY VEHICLE
Filed Oct. 1, 1921
3 Sheets-Sheet 2
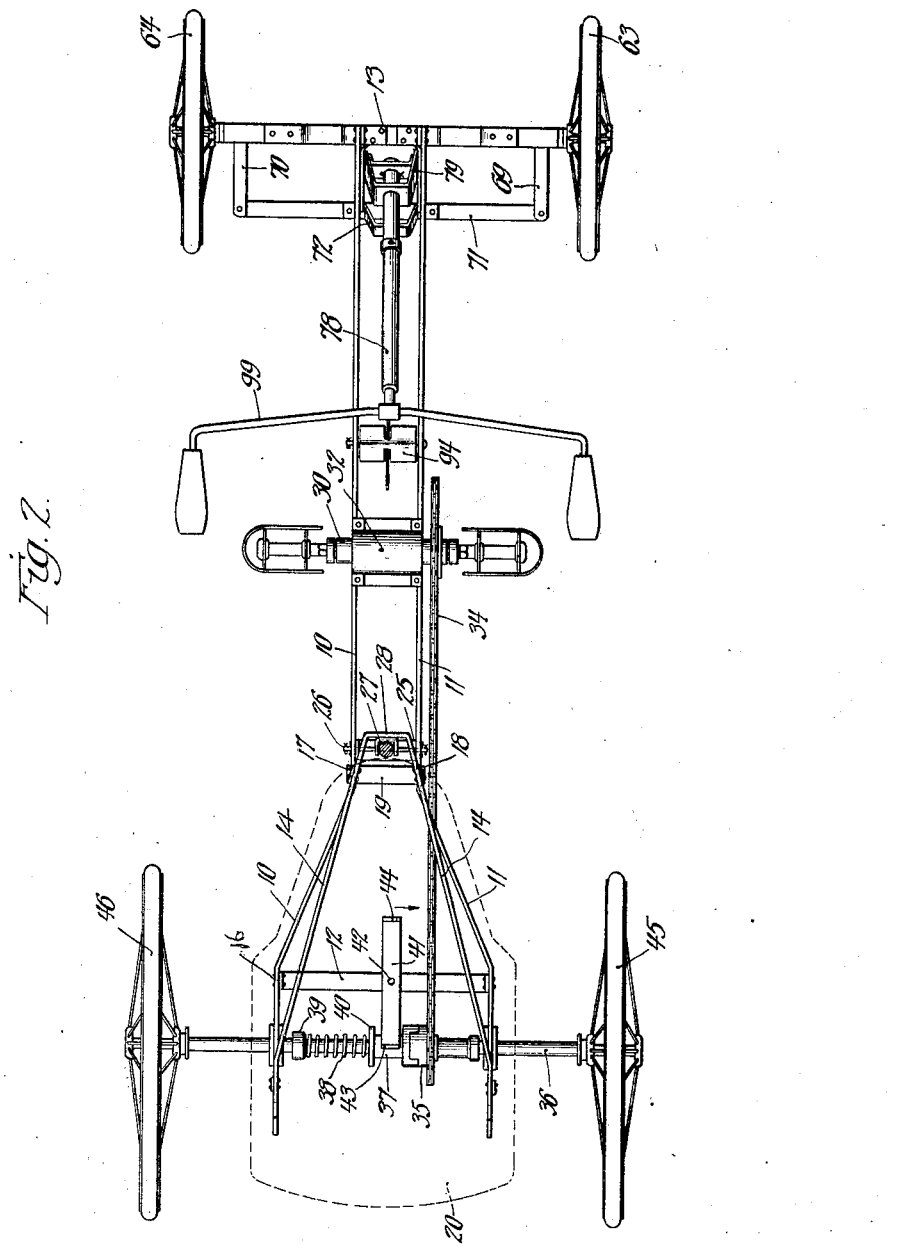

March 9, 1926.  
G. L. BURLINGAME  
CHILD'S TOY VEHICLE  
Filed Oct. 1, 1921  
1,575,618  
3 Sheets-Sheet 3
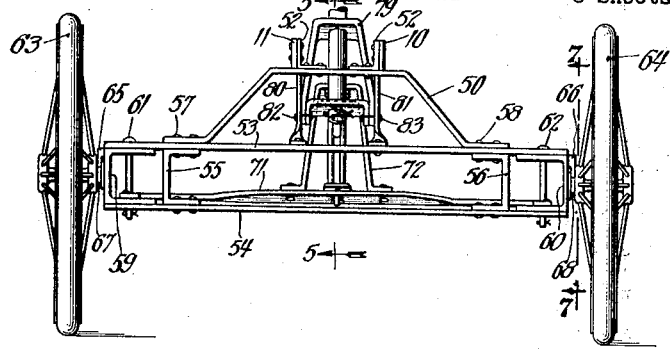
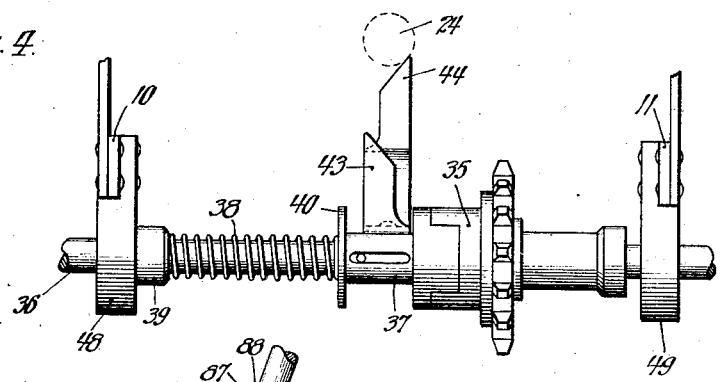
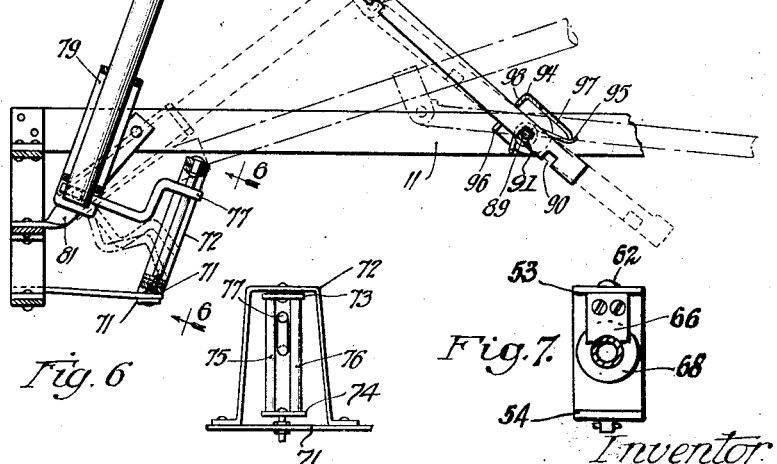
Inventor  
George L. Burlingame  
By: Gabel & Mueller  
Attys Patented Mar. 9, 1926.

1,575,618

UNITED STATES PATENT OFFICE.

GEORGE L. BURLINGAME, OF CHICAGO, ILLINOIS.

CHILD'S TOY VEHICLE.

Application filed October 1, 1921. Serial No. 504,582.

*To all whom it may concern:*

Be it known that I, GEORGE L. BURLINGAME, a citizen of the United States, residing at Chicago, in the county of Cook and State of Illinois, have invented a certain new and useful Improvement in Children's Toy Vehicles, of which the following is a full, clear, concise, and exact description, reference being had to the accompanying drawings, forming a part of this specification.

My invention relates to children's toy vehicles and has to do more particularly with the production of a combination pedal propelled vehicle and so-called pusher or push-car, an object being to provide a combination structure of this character.

A further object is to provide a vehicle of this character which may be readily changed from one type to the other, which is simple of construction, positive in its operation, comparatively cheap to manufacture as demanded in vehicles of this kind, easy to propel and speedy in action.

In the accompanying drawings I have shown the preferred form of my invention in which Fig. 1 is a side elevation thereof;

Fig. 2 is a plan view of Fig. 1;

Fig. 3 is a front view thereof but with the upper portions broken away;

Fig. 4 is an enlarged view of the rear clutch and driving axle;

Fig. 5 is a side view of a portion of the frame and handle bar steering rod, enlarged so as to more clearly show the method of adjusting the same to different operating positions; and Fig. 6 is a detail face view of the steering mechanism bracket which is adjustably engaged by the steering rod arm.

Fig. 7 is a transverse sectional view along the line 7—7 of Fig. 3, which is through the slot 68 of the wheel hub looking in the direction of the arrow.

Figure 1:
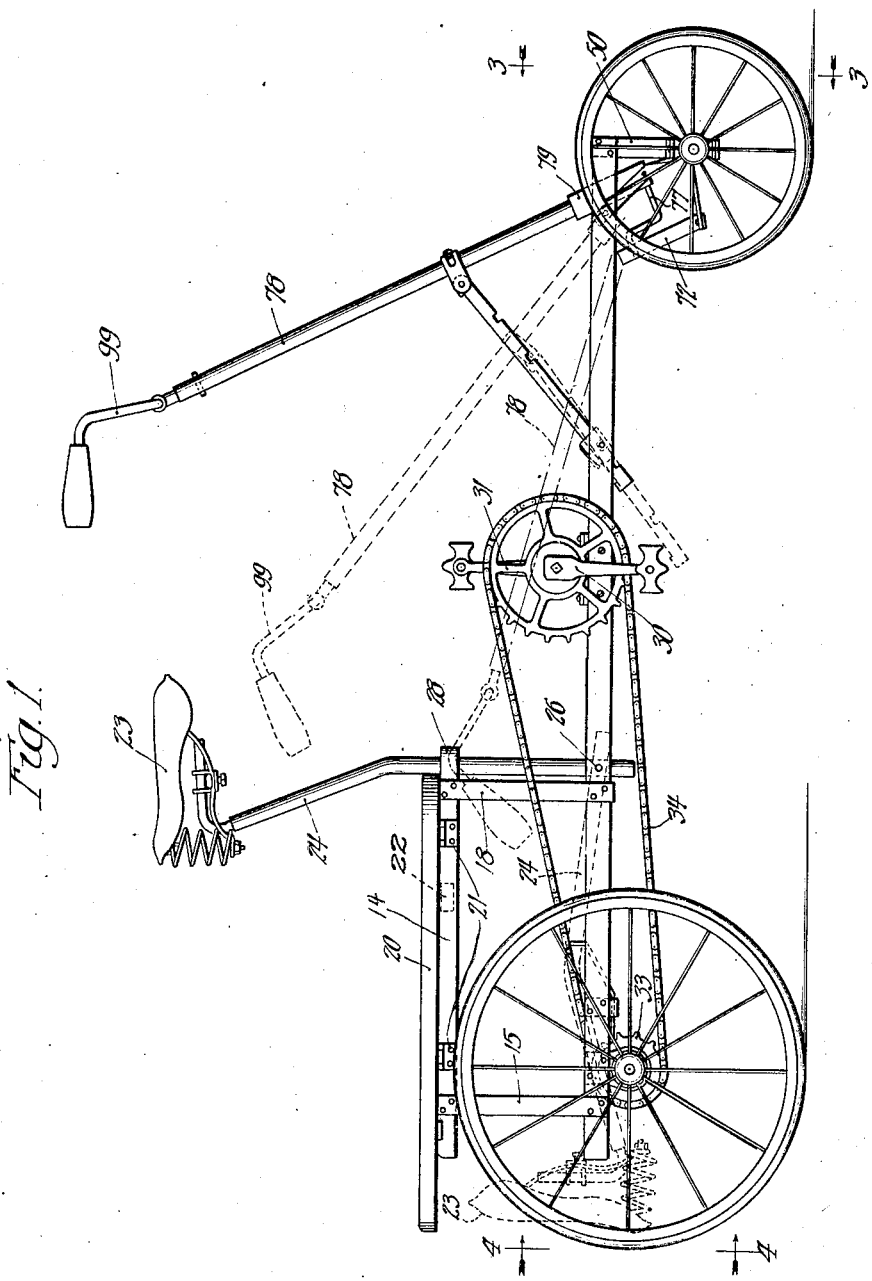

Referring now more in detail to the construction of my invention, it comprises a frame including lower side bars 10—11 rigidly held together by a cross bar 12 at the rear end and a bracket construction 13 at the front end. The upper portion of the frame is a V-shaped member having sides 14—14 and attached to the lower part of the frame by vertical brackets 15—16 17—18, the latter two elements 17—18 being a U-shaped bracket with the cross bar 19 thereof extending beneath the side frame pieces 10—11.

Supported on this frame is a carrier top 20 shown in dotted lines in Fig. 2, this acting also as a low flat seat or rest when the vehicle has to be used as a push-car at which time the child may sit on it or place one knee on it and push the vehicle along with the other foot. The carrier board 20 is preferably hinged to the frame by hinges 21 so that it may be lifted to drop the elevated saddle, as will be hereinafter more fully described. The carrier seat is held in its lower or normal position by an angular spring clip 22 (Fig. 1) which frictionally engages the side bar 13 to hold the seat in place.

As to the elevated saddle 23 and its supporting means, this includes a standard 24 pivotally attached to the lower frame by a saddle standard yoke 25 held by a pivot shaft 26 which extends through the frame pieces 10—11, the saddle standard yoke 25 and the saddle standard 24. To prevent side play of the saddle standard I preferably secure a U-shaped clip or bracket member 27 to the cross piece 28 of the upper frame and into which the saddle standard 24 slides as shown in Fig. 2. To lock the saddle standard in its upright or riding position I preferably arrange the forward end of the carrier seat 20 so that as the seat is dropped into its riding position it tightly engages the saddle standard and locks it in the U-shaped clip 27, as shown in Fig. 1.

Thus the saddle may be raised or lowered to its alternate riding and disappearing positions as shown by the full and dotted lines respectively in Fig. 1 by simply raising the seat 20 to permit such movement. With the saddle in its riding position as indicated by the full lines in Fig. 1 it is locked by the seat 20, and to lower it to its dotted position the seat 20 is simply raised on its hinges 21 clear of the saddle standard 24 at which time it may be dropped down beneath the seat and the seat dropped back into its riding position over the saddle.

Now as to the pedal propelling mechanism, I provide a suitable hanger and pedal structure 30 having a sprocket 31 and supported preferably in a ball bearing hood 32 suitably supported upon the frame side pieces 10—11. The driving sprocket 31 is connected to the rear sprocket 33 by the usual chain 34. Said rear sprocket is attached to a hub or sleeve 35 freely rotatable upon the rear axle 36 but held against longitudinal movement upon the axle. This hub 35 is adapted to be engaged by a clutch member 37 which is locked against relative movement upon the axle 36 but longitudinally movable thereon so as to engage and disengage with the sprocket hub 35 to lock and unlock the driven sprocket and rear axle 36. The two parts 35—37 of the rear clutch are normally held together by the spring 38 which is held between a collar 39 fastened to the rear axle and a washer 40 attached to the clutch member 37.

To operate the clutch I provide a clutch arm 41 pivoted at 42 to the frame cross piece 12 and having oppositely positioned, upwardly extending, angular edged lugs 43—44 between which the saddle standard 24 rides at it is dropped down into its horizontal position. This rotates the clutch arm 41 in the direction of the arrow indicated thereon in Fig. 2 thereby moving the clutch lock 37 out of driving engagement with sprocket clutch sleeve 35 so as to permit a free rotation of the rear wheels 45—46.

The rear axle 36 is supported in suitable ball bearing hangers 48—49 rigidly secured to the frame side members 10—11. Thus the lowering of the elevated saddle used preferably with the pedal propelling mechanism automatically disconnects the pedal driving mechanism from the rear wheels so that the vehicle may be used as the ordinary pushcar without interference with the pedals which will remain stationary when the car is pushed forward or backward.

Now, as to the front wheels, and the steering mechanism therefor, I provide a front axle in the nature of a rigid frame comprising a bracket 50 secured to the frame side pieces 10—11 by short angle pieces 52. Two transversely extending flat bars 53—54 are made into a rigid frame by means of channel pieces 55—56 and riveted to the bracket 50 at 57—58. The ends of the frame members 53—54 form forks in which U-shaped wheel supports 59—60 are pivotally carried by bolts 61—62. The supports 59—60 have outwardly extending rigidly connected axles for the front wheels 63—64, the wheels being held by means of small L-shaped angle pieces 65—66 which are secured to the outer faces of the supports 59—60 and having legs which extend down into circumferential grooves 67—68 on the wheel hubs. Thus the wheels are held on the axles by the legs extending into the grooves but are permitted to freely rotate. The wheel supports 59—60 carry rearwardly extending steering arms 69—70 pivotally connected by a cross bar 71. Thus, as the cross bar 71 is shifted to the right or left the front wheels are correspondingly moved.

The cross bar 71 for the front wheels is universally connected with the handle bar or steering post, which post is tiltable to different operating positions, the universal connection permitting such tilting but still maintaining the parts operatively connected. This universal connection includes the bracket 72 (Fig. 6) riveted to the cross piece 71 and having a yoke piece pivotally mounted therein including upper and lower cross pieces 73, 74, and round side pieces 75, 76. Between the two uprights 75, 76, of this yoke is the rearwardly extending arm 77 which is rigidly carried by the handle bar or steering post 78. This post is rotatably mounted in a steering rod hinge 79, which hinge is pivotally attached to the frame at the angularly disposed brackets 80, 81, said pivotal connection being by means of the pivot pins 82, 83.

It will thus be seen that the handle bar or steering post 78, which may be moved into various positions as indicated by the full and dotted lines in Figs. 1 and 5, is universally connected to the front wheels through the mechanism described so that it may be operated regardless of the position to which it is adjusted.

Now in order to hold the steering post in its adjusted position, I provide a bracket member in the form of a flat bar 84 which is pivotally connected at 85 to the collar piece 86 slidably attached to the steering post by means of a screw 87 which passes through a slot 88 in the collar piece 86 so that the post may be rotated therein. The bracket member 84 may be adjusted to various positions to support the steering post in its various adjustments and to this end I provide a cross pin 89 rigidly attached between the side members 11, 10, and cooperating with suitable notches 90, 91, 92 and 93. In order to hold this bracket in its various positions, I provide a spring pressed tiltable locking member 94 movable on the pin 89 as an axis and pressing against the bar 84 through the action of spring 95. The bracket bar 84 extends through a slot 96 in one leg of the locking member 94, the other leg of which is slotted at 97 so as to clear the bar when this latter leg is pressed downwardly to free its part 98 from the bracket bar 84, so that said bar may be lifted clear of the pin 89 and moved into the desired adjustment.

At the top of the steering post 78 is a suitable handle bar 99 adjustably mounted in the steering post, so that it may be moved to various customary positions.

It will thus be seen that in connection with the steering mechanism I have provided a handle bar carried by the steering post which may be adjusted to various positions and universally connected to the steering wheels in such a manner that as the steering post is moved into its various adjustments the universal connection maintains the parts operatively connected without any additional operation in connection therewith. That is, the steering connection is automatically maintained regardless of the adjustment of the handle bar post.

What I claim as new and desire to secure by United States Letters Patent is:

1. In a child's toy vehicle of the character described, the combination of a pedal propelled vehicle having pedal propelling means and push-car including an elevated seat for pedal propelling, means for supporting said seat whereby it may be elevated or lowered, and clutch mechanism for rendering the pedal propelling mechanism inoperative responsive to lowering of said seat.

2. In a child's toy vehicle of the character described, the combination of a pedal propelled vehicle having pedal propelling means and push-car with a knee rest, an elevated seat usable with the pedal propelling means, means for supporting said elevated seat whereby it may be shifted from a usable to a non-usable position and vice versa, and clutch mechanism responsive to the shifting of the pedaling seat for operating the clutch mechanism to connect and disconnect the propelling means responsive to the corresponding shifting of said seat.

3. In a child's toy vehicle of the character described, the combination of a pedal propelled vehicle having pedal propelling means and push-car with a knee rest, with means readily operable for changing from one to the other, and a steering device pivotally adjustable to different positions corresponding to the pedal propelled vehicle and to the push-car and operable from either.

4. In a child's toy vehicle of the character described, the combination of a pedal propelled vehicle having pedal propelling means and push-car with a knee rest, with means readily operable for changing from one to the other, including mechanism for automatically connecting and disconnecting the propelling means responsive to operation of said changing means, and a steering device adjustable to different positions for use with the pedal propelled vehicle or with the push-car.

5. In a child's toy vehicle of the character described, the combination of a pedal propelled vehicle and push-car including a lowerable elevated seat for pedal propelling and a low flat seat and knee rest for the push-car, and means supporting the low seat and the elevated seat operable to lower the elevated seat clear of the low seat to permit non-interfering use of the latter.

6. In a child's toy vehicle of the character described, the combination of a pedal propelled vehicle and push-car including an elevated seat for pedal propelling and a low seat for the push-car, and means supporting the elevated seat and the low seat operable so as to lower the elevated seat beneath the low seat.

7. In a child's toy vehicle of the character described, the combination of a pedal propelled vehicle and push-car including a pivotally mounted elevated seat for pedal propelling and a low seat for the push-car, and means supporting the low seat to permit lifting and replacing thereof so as to pivotally lower the elevated seat back beneath the low seat.

8. A child's toy vehicle of the character described comprising, a long narrow horizontal frame, driving wheels carried at the rear of the frame, a pedal propelling hanger supported at the middle of the frame and connected with the driving wheels, an elevated seat at the middle of the frame operatively related to the pedal mechanism, a combined low seat and knee rest at the rear of the frame, a pair of steerable wheels mounted at the forward end of the frame, an adjustably mounted steering handle bar adjustable for operation from either seat, and means operatively connecting the handle bar and front wheels.

In witness whereof, I hereunto subscribe my name this 23rd day of September, A. D. 1921.

GEORGE L. BURLINGAME.